United States Patent
Yasrebi et al.

(10) Patent No.: US 9,866,521 B2
(45) Date of Patent: Jan. 9, 2018

(54) METHODS, SYSTEMS, AND COMPUTER READABLE STORAGE DEVICES FOR DETERMINING WHETHER TO FORWARD REQUESTS FROM A PHYSICAL TELEPHONE NUMBER MAPPING SERVICE SERVER TO A VIRTUAL TELEPHONE NUMBER MAPPING SERVICE SERVER

(71) Applicant: AT&T INTELLECTUAL PROPERTY I, L.P., Atlanta, GA (US)

(72) Inventors: Mehrad Yasrebi, Austin, TX (US); James E. Jackson, Austin, TX (US); Art Daddona, Austin, TX (US)

(73) Assignee: AT&T Intellectual Property L.L.P., Atlanta, GA (US)

( * ) Notice: Subject to any disclaimer, the term of this patent is extended or adjusted under 35 U.S.C. 154(b) by 177 days.

(21) Appl. No.: 14/814,111

(22) Filed: Jul. 30, 2015

(65) Prior Publication Data
US 2017/0034117 A1 Feb. 2, 2017

(51) Int. Cl.
*H04L 12/16* (2006.01)
*H04L 29/12* (2006.01)
*H04M 7/12* (2006.01)
*H04L 29/06* (2006.01)

(52) U.S. Cl.
CPC .......... *H04L 61/157* (2013.01); *H04L 61/106* (2013.01); *H04M 7/128* (2013.01); *H04L 61/1511* (2013.01); *H04L 61/605* (2013.01); *H04L 65/00* (2013.01)

(58) Field of Classification Search
CPC ............... H04L 61/106; H04L 61/1511; H04L 61/157; H04L 61/605; H04L 65/00; H04M 7/128
See application file for complete search history.

(56) References Cited

U.S. PATENT DOCUMENTS

| 4,769,811 | A | 9/1988 | Eckberg et al. |
| 5,751,967 | A | 5/1998 | Raab et al. |
| 6,643,262 | B1 | 11/2003 | Larsson et al. |
| 7,274,683 | B2 | 9/2007 | Segal |
| 7,567,804 | B1 | 7/2009 | Mangal |

(Continued)

FOREIGN PATENT DOCUMENTS

| AU | 744884 B2 | 6/2002 |
| CA | 2464065 C | 2/2013 |

(Continued)

OTHER PUBLICATIONS

U.S. Office Action dated Nov. 7, 2016 in U.S. Appl. No. 14/814,095.

(Continued)

*Primary Examiner* — Kan Yuen
(74) *Attorney, Agent, or Firm* — Hartman & Citrin LLC

(57) ABSTRACT

A determination is made whether to forward a request for communication services associated with a specific number range from a physical telephone number mapping service server to a virtual telephone number mapping service server. Responsive to determining to forward the request, a determination is made whether a virtual telephone number mapping service instance has been provisioned to handle requests associated with the specific number range.

17 Claims, 13 Drawing Sheets

(56) References Cited

U.S. PATENT DOCUMENTS

| | | | |
|---|---|---|---|
| 7,624,417 B2 | 11/2009 | Dua | |
| 7,706,401 B2 | 4/2010 | Bae et al. | |
| 7,831,697 B2 | 11/2010 | Fukushima | |
| 7,920,549 B2 | 4/2011 | All et al. | |
| 7,937,438 B1 | 5/2011 | Miller et al. | |
| 8,065,676 B1 | 11/2011 | Sahai et al. | |
| 8,086,808 B2 | 12/2011 | Ichikawa | |
| 8,165,116 B2 | 4/2012 | Ku et al. | |
| 8,169,951 B1 | 5/2012 | Mangal | |
| 8,171,160 B1 | 5/2012 | Ward et al. | |
| 8,175,103 B2 | 5/2012 | Germain et al. | |
| 8,250,572 B2 | 8/2012 | Dahlstedt | |
| 8,296,434 B1 | 10/2012 | Miller et al. | |
| 8,305,932 B2 | 11/2012 | Qiu et al. | |
| 8,321,376 B2 | 11/2012 | Boman et al. | |
| 8,359,223 B2 | 1/2013 | Chi et al. | |
| 8,365,156 B2 | 1/2013 | Sollich | |
| 8,407,323 B2 | 3/2013 | Flavel et al. | |
| 8,423,646 B2 | 4/2013 | Jamjoom et al. | |
| 8,429,276 B1 | 4/2013 | Kumar et al. | |
| 8,433,802 B2 | 4/2013 | Head et al. | |
| 8,442,955 B2 | 5/2013 | Al Kiswany et al. | |
| 8,457,117 B1 | 6/2013 | Wood et al. | |
| 8,458,342 B2* | 6/2013 | Ku | H04L 29/1216 709/227 |
| 8,560,646 B1 | 10/2013 | Sivasubramanian et al. | |
| 8,571,011 B2 | 10/2013 | All et al. | |
| 8,594,077 B2 | 11/2013 | Mangal | |
| 8,612,599 B2 | 12/2013 | Tung et al. | |
| 8,631,403 B2 | 1/2014 | Soundararajan et al. | |
| 8,656,018 B1 | 2/2014 | Keagy et al. | |
| 8,689,292 B2 | 4/2014 | Williams et al. | |
| 8,724,620 B2 | 5/2014 | Ku et al. | |
| 8,750,884 B1 | 6/2014 | Gorman et al. | |
| 8,776,090 B2 | 7/2014 | Elzur | |
| 8,792,882 B2 | 7/2014 | Fighel | |
| 8,830,878 B1 | 9/2014 | Van Rensburg | |
| 8,849,976 B2 | 9/2014 | Thibeault | |
| 8,879,545 B2 | 11/2014 | Jackson et al. | |
| 8,903,888 B1 | 12/2014 | Hyser et al. | |
| 8,909,744 B2 | 12/2014 | Rathore | |
| 8,914,511 B1 | 12/2014 | Yemini et al. | |
| 8,914,525 B2 | 12/2014 | Ku | |
| 2006/0041733 A1 | 2/2006 | Hyser | |
| 2006/0165060 A1 | 7/2006 | Dua | |
| 2007/0019545 A1 | 1/2007 | All et al. | |
| 2008/0005403 A1 | 1/2008 | Di Flora | |
| 2008/0090569 A1 | 4/2008 | Khan et al. | |
| 2008/0165706 A1* | 7/2008 | Bozionek | H04M 7/006 370/259 |
| 2008/0166994 A1 | 7/2008 | Ku et al. | |
| 2008/0222633 A1 | 9/2008 | Kami | |
| 2008/0281975 A1 | 11/2008 | Qiu et al. | |
| 2008/0285543 A1 | 11/2008 | Qiu et al. | |
| 2008/0317000 A1 | 12/2008 | Jackson | |
| 2009/0103707 A1 | 4/2009 | Mcgary et al. | |
| 2009/0147770 A1 | 6/2009 | Ku | |
| 2009/0161854 A1 | 6/2009 | Ku et al. | |
| 2009/0248896 A1 | 10/2009 | Cohn | |
| 2009/0249284 A1 | 10/2009 | Antosz et al. | |
| 2009/0276228 A1 | 11/2009 | Isaacson | |
| 2009/0276771 A1 | 11/2009 | Nickolov et al. | |
| 2009/0282404 A1 | 11/2009 | Khandekar et al. | |
| 2010/0042720 A1 | 2/2010 | Stienhans et al. | |
| 2010/0157986 A1 | 6/2010 | Rao et al. | |
| 2010/0223378 A1 | 9/2010 | Wei et al. | |
| 2010/0232592 A1 | 9/2010 | Ku | |
| 2010/0232593 A1 | 9/2010 | Ku | |
| 2010/0281125 A1 | 11/2010 | Virtanen et al. | |
| 2010/0322255 A1 | 12/2010 | Hao et al. | |
| 2011/0019661 A1 | 1/2011 | Ku | |
| 2011/0066597 A1 | 3/2011 | Mashtizadeh et al. | |
| 2011/0078303 A1 | 3/2011 | Li et al. | |
| 2011/0093847 A1 | 4/2011 | Shah | |
| 2011/0138047 A1 | 6/2011 | Brown et al. | |
| 2011/0150196 A1 | 6/2011 | Dwight et al. | |
| 2011/0179184 A1 | 7/2011 | Breau et al. | |
| 2011/0216762 A1 | 9/2011 | Nas | |
| 2011/0235631 A1 | 9/2011 | Krishnaswamy et al. | |
| 2011/0282739 A1 | 11/2011 | Mashinsky et al. | |
| 2012/0066375 A1 | 3/2012 | Phaal | |
| 2012/0130782 A1 | 5/2012 | Ratnakar | |
| 2012/0173279 A1 | 7/2012 | Li et al. | |
| 2012/0207151 A1 | 8/2012 | All et al. | |
| 2012/0300768 A1 | 11/2012 | Huang et al. | |
| 2012/0323852 A1 | 12/2012 | Jain et al. | |
| 2013/0007753 A1 | 1/2013 | Jain | |
| 2013/0016626 A1 | 1/2013 | Qiu et al. | |
| 2013/0042239 A1 | 2/2013 | Mousseau et al. | |
| 2013/0054813 A1 | 2/2013 | Bercovici et al. | |
| 2013/0060839 A1 | 3/2013 | Van Biljon et al. | |
| 2013/0067345 A1 | 3/2013 | Das et al. | |
| 2013/0129066 A1 | 5/2013 | Yeung et al. | |
| 2013/0166606 A1 | 6/2013 | Fricke | |
| 2013/0179895 A1 | 7/2013 | Calder | |
| 2013/0182574 A1 | 7/2013 | So et al. | |
| 2013/0185432 A1 | 7/2013 | So et al. | |
| 2013/0232480 A1 | 9/2013 | Winterfeldt et al. | |
| 2013/0232497 A1 | 9/2013 | Jalagam et al. | |
| 2013/0232498 A1 | 9/2013 | Mangtani et al. | |
| 2013/0254854 A1 | 9/2013 | Moganti et al. | |
| 2013/0290499 A1 | 10/2013 | Radhakrishnan et al. | |
| 2013/0294443 A1 | 11/2013 | Kahn | |
| 2013/0297802 A1 | 11/2013 | Laribi et al. | |
| 2013/0326517 A1 | 12/2013 | Castillo et al. | |
| 2014/0052949 A1 | 2/2014 | Wang et al. | |
| 2014/0068602 A1 | 3/2014 | Gember et al. | |
| 2014/0068703 A1 | 3/2014 | Balus et al. | |
| 2014/0082131 A1 | 3/2014 | Jagtap | |
| 2014/0082612 A1 | 3/2014 | Breitgand et al. | |
| 2014/0086253 A1 | 3/2014 | Yong | |
| 2014/0143514 A1 | 5/2014 | Kulkarni et al. | |
| 2014/0157272 A1 | 6/2014 | Dahlstedt | |
| 2014/0161447 A1 | 6/2014 | Graves et al. | |
| 2014/0164476 A1 | 6/2014 | Thomson | |
| 2014/0173195 A1 | 6/2014 | Rossel et al. | |
| 2014/0176583 A1 | 6/2014 | Abiezzi et al. | |
| 2014/0195604 A1 | 7/2014 | Wyatt et al. | |
| 2014/0204760 A1 | 7/2014 | Durrani et al. | |
| 2014/0211610 A1 | 7/2014 | Ku et al. | |
| 2014/0215033 A1 | 7/2014 | Ravichandran et al. | |
| 2014/0241247 A1 | 8/2014 | Kempf et al. | |
| 2014/0254603 A1 | 9/2014 | Banavalikar et al. | |
| 2014/0269325 A1 | 9/2014 | Chrysos et al. | |
| 2014/0282522 A1 | 9/2014 | Daly et al. | |
| 2014/0297979 A1 | 10/2014 | Baron et al. | |
| 2014/0334482 A1 | 11/2014 | Nikeyenkov | |
| 2014/0337500 A1 | 11/2014 | Lee | |
| 2014/0337834 A1 | 11/2014 | Adogla | |
| 2014/0347998 A1 | 11/2014 | Kim et al. | |
| 2014/0351539 A1 | 11/2014 | Raj et al. | |
| 2014/0355450 A1 | 12/2014 | Bhikkaji et al. | |
| 2014/0362859 A1 | 12/2014 | Addanki et al. | |
| 2014/0365662 A1 | 12/2014 | Dave et al. | |
| 2015/0012570 A1 | 1/2015 | Le et al. | |
| 2016/0088162 A1 | 3/2016 | Carlos | |

FOREIGN PATENT DOCUMENTS

| | | | |
|---|---|---|---|
| EP | 1126681 A2 | 8/2001 | |
| EP | 1820310 A2 | 8/2007 | |
| EP | 2439637 | 10/2010 | |
| EP | 2569902 A2 | 3/2013 | |
| EP | 2779590 A1 | 9/2014 | |
| TW | 201403315 | 1/2014 | |
| WO | WO 2013163216 A1 | 10/2013 | |
| WO | WO 2014118736 A2 | 8/2014 | |
| WO | WO 2014147480 A1 | 9/2014 | |

(56) References Cited

OTHER PUBLICATIONS

U.S. Office Action dated Dec. 6, 2016 in U.S. Appl. No. 14/814,098.
Caelli, William, Vicky Liu, and She-I. Chang. "Trust in merged ERP and open data schemes in the 'Cloud'" (2014). http://eprints.qut.edu.au/69887/1/Caelli_Liu_Chang_submit_6.pdf.
Singh, Kulwinder, and Dong-Won Park. "Economical Global Access to a VoiceXML Gateway Using Open Source Technologies." 22nd International Conference on Computational Linguistics. 2008. http://www.aclweb.org/anthology/W/W08/W08-15.pdf?origin=publication_detail#page=27.
Ulseth, T. R. O. N. D. "Telephone Number Mapping (ENUM)—A short overview."TELEKTRONIKK 102.1 (2006): 40. http://www.telenor.com/wp-contenl/uploads/2012/05/T06_1.pdf#page=42.
Strand, Lars, and Wolfgang Leister. "A survey of SIP Peering." NATO ASI-Architects of secure Networks (ASIGE10) (2010). http://larsstrand.no/NR/papers/conf/asige10/ASIGE10-presentation.pdf.
Kantola, Raimo, Jose Costa Requena, and Nicklas Beijar. "Interoperable routing for IN and IP Telephony." Computer Networks 35.5 (2001): 597-609. http://www.nellab.tkk.fi/tutkimus/imelio/papers/VOIP/cocom09f-00wpic.pdf.
Voznak, Miroslav. "Advanced implementation of IP telephony at Czech universities." WSEAS Transactions on Communications 9.10 (2010): 679-693. http://www.researchgate.net/publication/228564659_Advanced_implementation_of_IP_telephony_at_Czech_universities/file/504635117 a95f4851d.
Ramanathan, Sakkaravarthi, et al. "Model-based provisioning and management of adaptive distributed communication in mobile cooperative systems." (2011). http://hal.archives-ouvertes.fr/docs/00/67/69/40/PDF/BookVersion_1.1.pdf.
Rosenberg, Jonathan. "A data model for presence." Network Working Group, Cisco Systems, (Jul. 2006). http://tools.ietf.org/html/rfc4479.html.
Zhang, Ge. "Towards Secure SIP Signalling Service for VoIP applications."Karlstad University Studies (2009). http://www.cst-est.kau.se/gezhang/Zhang_lic.pdf.
Grefen, Paul, et al. "Dynamic business network process management in instant virtual enterprises." Computers in Industry 60.2 (2009): 86-103. http://is.tm.tue.nl/staff/heshuis/BETA0/o20WP198.pdf.
Grefen, Paul, Heiko Ludwig, and Samuii Angelov. "A three-level framework for process and data management of complex e-services." International Journal of Cooperative Information Systems 12.04 (2003): 487-531. http://www.researchgate.net/publication/220094965_A_ThreeLevel_Framework_for_Process_and_Data_Management_of_Complex_EServices/file/d912f50bcf2dfb9067.pdf.
Eshuis, Rik, and Paul Grefen. "Constructing customized process views." Data and Knowledge Engineering 64.2 (2008): 419-438. http://is.ieis.tue.nl/staff/heshuis/ccpv.pdf.
Vonk, Jochern, and Paul Grefen. "Cross-organizational transaction support for e-services in virtual enterprises." Distributed and Parallel Databases 14.2 (2003): 137-172. hllp://alexandria.tue.nl/repository/freearticles/613435.pdf? origin=publication_detaii.
Kecskemeti, Gabor, et al. "An approach for virtual appliance distribution for service deployment." Future Generation Computer Systems 27.3 (2011): 280-289. http://users.iit.uni-miskolc.hu/~kecskemeti/publications/KecskemetiFgcsAVSActiveRepo.pdf. http://docs.openstack.org/user-guide-admin/dashboard_manage_flavors.html, Apr. 2015.
Verma, Akshat, Gautam Kumar, and Ricardo Koller. "The cost of reconfiguration in a cloud." Proceedings of the 11th International Middleware Conference Industrial track. ACM, 2010. http://www.cs.berkeley.edu/••gautamk/papers/migration-mwlO.pdf.
Mi, Haibo, et al. "Online self-reconfiguration with performance guarantee for energy-efficient large-scale cloud computing data centers." Services Computing (SCC), 2010, IEEE International Conference on IEEE, 2010. http://www.trustie.net/userfiles/file/scc2010.pdf.
Chieu, Trieu C., et al. "Dynamic scaling of web applications in a virtualized cloud computing environment." eBusiness Engineering, 2009. ICEBE'09. IEEE International Conference on. IEEE, 2009. http://wise.ajou.ac.kr/dlog2012/files/Dynamic%20Scaling%20of%20Web%20Applications%20%20%20in%20a%20Virtualized%20Cloud%20Computing%20Environment.pdf.
Armbrust, Michael, et al. "A view of cloud computing." Communications of the ACM 53.4 (2010): 50-58. http://ftp.cs.duke.edu/courses/cps296.4/compsci590. 4/falll3/838-Cloud Papers/AboveTheClouds.pdf.
Kesavan, Mukil, Ada Gavrilovska, and Karsten Schwan. "Xerxes: Distributed load generator for cloud-scale experimentation." Open Cirrus Summit (OCS), 2012 Seventh. IEEE, 2012. http://www.istc-cc.cmu.edu/publications/papers/2012/xerxes.pdf.
"IBM PureFlex Systems with VMware," vmware.com, Apr. 2012, Copyright IBM Corporation 2012. http://www.vmware.com/files/pdf/partners/ibm/IBM_PureFlex_Systems_with_VMware.pdf.
Kakoulli et al. "Intelligent hotspot prediction for network-on-chip-based multicore systems," Computer-Aided Design of Integrated Circuits and Systems, IEEE Transactions on 31.3 (2012): 418-431. http://ieeexplore.ieee.org/xpl/login.jsp?tp=&arnumber=6152782&url=http%3A%2F%2Fieeexplore.ieee.org%2Fxpls%2Fabs_all.jsp%3Farnumber%3D6152782.
Hao, Fang, et al. "Enhancing dynamic cloud-based services using network virtualization." Proceedings of the 1st ACM workshop on Virtualized infrastructure systems and architectures. ACM, 2009. http://www1.arl.wustl.edu/-hs 1/publication/p37. pdf.
Foster, M., T. McGarry, and J. Yu. "Number portability in the Global Switched Telephone Network (GSTN): an overview." RFC3482, IETF, Feb. (2003). https://tools.ielf.org/html/draft-mayrhofer-enum-loc-enumservice-00.
Malas, D. "SPEERMINT Peering Architecture," Internet-Draft, SPEERMINT, Oct. 22, 2010. http://133.40.3.100/pdf/draft-ielf-speermint-architecture-12.pdf.
Penno, R., "Speermint Peering Architecture," Internet Draft, Speermint Working Group, Feb. 24, 2008. http://133.40.3.100/pdf/draft-ietf-speermint-architecture-05.pdf.
Raatikainen, Pertti. "Next Generation Network and Reliability." Technical Research Centre of Finland (2007). http://iplu.vtt.fi/ngn_report.pdf.
Cakmak, Gorkem. "Internet Interconnection Ecosystem in Finland." Diss. Aalto University, 2013. https://aaltodoc.aalto.fi/bitstream/handle/123456789/12012/master_Cakmak_G%C3%B6rkem_2013.pdf?sequence=1.
"Global UNUM: The underlying infrastructure for service discovery in the migration to the all-IP communications future," A Neustar White paper, neustar.biz, Neustar, Inc., Sterling, VA. 2010. http://www.neustar.bizicarrier/docs/whitepapers/neustar_global_enum_white_paper.pdf.
"Solution Brief: OpenFlow-Enabled Hybrid Cloud Services Connect Enterprise and Service Provider Data Centers," Executive Summary, opennetworking.org, 2015. https://www.opennetworking.org/ja/solution-brief-openflow-enabled-hybrid-cloud-servicesconnect-enterprise-and-service-provider-data-centers.
U.S. Non-Provisional Patent Application titled "Methods, Systems, and Computer Readable Storage Devices for Handling Virtualization of a Physical Telephone No. Mapping Service".
U.S. Non-Provisional Patent Application titled "Methods, Systems, and Computer Readable Storage Devices for Adjusting the Use of Virtual Resources Providing Communication Services Based on Load".
U.S. Non-Provisional Patent Application titled "Methods, Systems, and Computer Readable Storage Devices for Determining Whether to Handle a Request for Communication Services by a Physical Telephone Number Mapping Service or a Virtual Telephone Number Mapping Service".
U.S. Notice of Allowance dated Apr. 3, 2017 in U.S. Appl. No. 14/814,095.

* cited by examiner

500

| ID | NAME | Memory_MB | DISK | SWAP | VCPUs |
|----|------|-----------|------|------|-------|
| 1 | m1.tiny | 512 | 0 | 0 | 1 |
| 2 | m1.small | 2048 | 20 | 20 | 1 |
| 3 | m1.medium | 4096 | 40 | 40 | 2 |
| 4 | m1.large | 8192 | 80 | 60 | 4 |
| 5 | m1.xlarge | 16384 | 160 | 80 | 8 |

| Image | VM Flavor ID | Initial Data Parameters | VM Instance ID | Performance Metrics | ... |
|---|---|---|---|---|---|
| | 610 | 620 | 630 | 640 | 650 | 660 |
| vENUM Name Server Instance Identifier | 2 | Number range, IP address, ... | Identifier of the specific instantiation | References to resource utilization data, ... | ... |

FIG. 6

METHODS, SYSTEMS, AND COMPUTER READABLE STORAGE DEVICES FOR DETERMINING WHETHER TO FORWARD REQUESTS FROM A PHYSICAL TELEPHONE NUMBER MAPPING SERVICE SERVER TO A VIRTUAL TELEPHONE NUMBER MAPPING SERVICE SERVER

TECHNICAL FIELD

The present disclosure relates generally to telecommunication services and, more particularly, to determining whether requests for communication services should be forwarded from physical resources to virtual resources.

BACKGROUND

Telephone number mapping is a system of unifying the international telephone number system of the public switched telephone network with the Internet addressing and identification name spaces. Internationally, telephone numbers are systematically organized by the E.164 standard, while the Internet uses the Domain Name System (DNS) for linking domain names to IP addresses and other resource information. Telephone number mapping systems provide facilities to determine applicable Internet communications servers responsible for servicing a given telephone number using DNS queries.

The most prominent standard for telephone number mapping is the E.164 Telephone Number Mapping (ENUM) standard. The ENUM standard uses special DNS record types to translate a telephone number into a Uniform Resource Identifier (URI) or IP address that can be used in Internet communications. Responsive to queries from clients in networks, such as Internet Protocol Multimedia Subsystem (IMS) networks, ENUM servers return Naming Authority Pointer Resource Records (NAPTRs). NAPTR records are most commonly used for applications in Internet communication session management, e.g., in the mapping of servers and user addresses in the Session Initiation Protocol (SIP). The NAPTR record corresponding to the subscriber URI contains the subscriber contact record information.

ENUM therefore functions as a mechanism for translating a telephone number into a domain name with the requested address or number associated with it. ENUM services have become the core of national and international session management protocols for Video/Voice over IP (VoIP). ENUM services are used by VoIP service providers around the world and are expected to be employed for inter-service-provider operability.

While the ENUM standard provides important services, in the competitive world of multimedia IP solutions, there is increasing pressure to improve infrastructure resiliency and cost structures. Physical ENUMs (pENUMs) are limited in the sense that they are fixed on the underlying computing and communications infrastructure, as compared to cloud infrastructures. Once a pENUM is in place, it is not very flexible, e.g., to accommodate changes in traffic loads or location changes.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for determining whether to forward a request for communication services associated with a specific number range from a physical telephone number mapping service server to a virtual telephone number mapping service server. Responsive to determining to forward the request, a determination is made whether a virtual telephone number mapping service instance has been provisioned to handle requests associated with the specific number range.

According to another illustrative embodiment, a system is provided including a processor and a memory. The memory has instructions stored thereon which, when executed by the processor, cause the processor to perform operations. The operations include determining whether to forward a request for communication services associated with a specific number range from a physical telephone number mapping service server to a virtual telephone number mapping service server. The operations further include, responsive to determining to forward the request, determining, by the processor, whether a virtual telephone number mapping service instance has been provisioned to handle requests associated with the specific number range.

According to another illustrative embodiment, a computer readable storing device is provided having instructions stored thereon which, when executed by a processor cause the processor to perform operations. The operations include determining whether to forward a request for communication services associated with a specific number range from a physical telephone number mapping service server to a virtual telephone number mapping service server. The operations further include, responsive to determining to forward the request, determining whether a virtual telephone number mapping service instance has been provisioned to handle requests associated with the specific number range.

BRIEF DESCRIPTION OF THE DRAWINGS

FIG. 5 shows a table listing an example of virtual machine flavors having different memory capacities.

FIG. 6 illustrates a table listing an example of data that may be collected and stored for an instantiated vENUM according to an illustrative embodiment.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

The ENUM standard is a core part of national and international session management protocols for providing multimedia communications. ENUM servers can be queried for every session initiation.

Figure 1A:
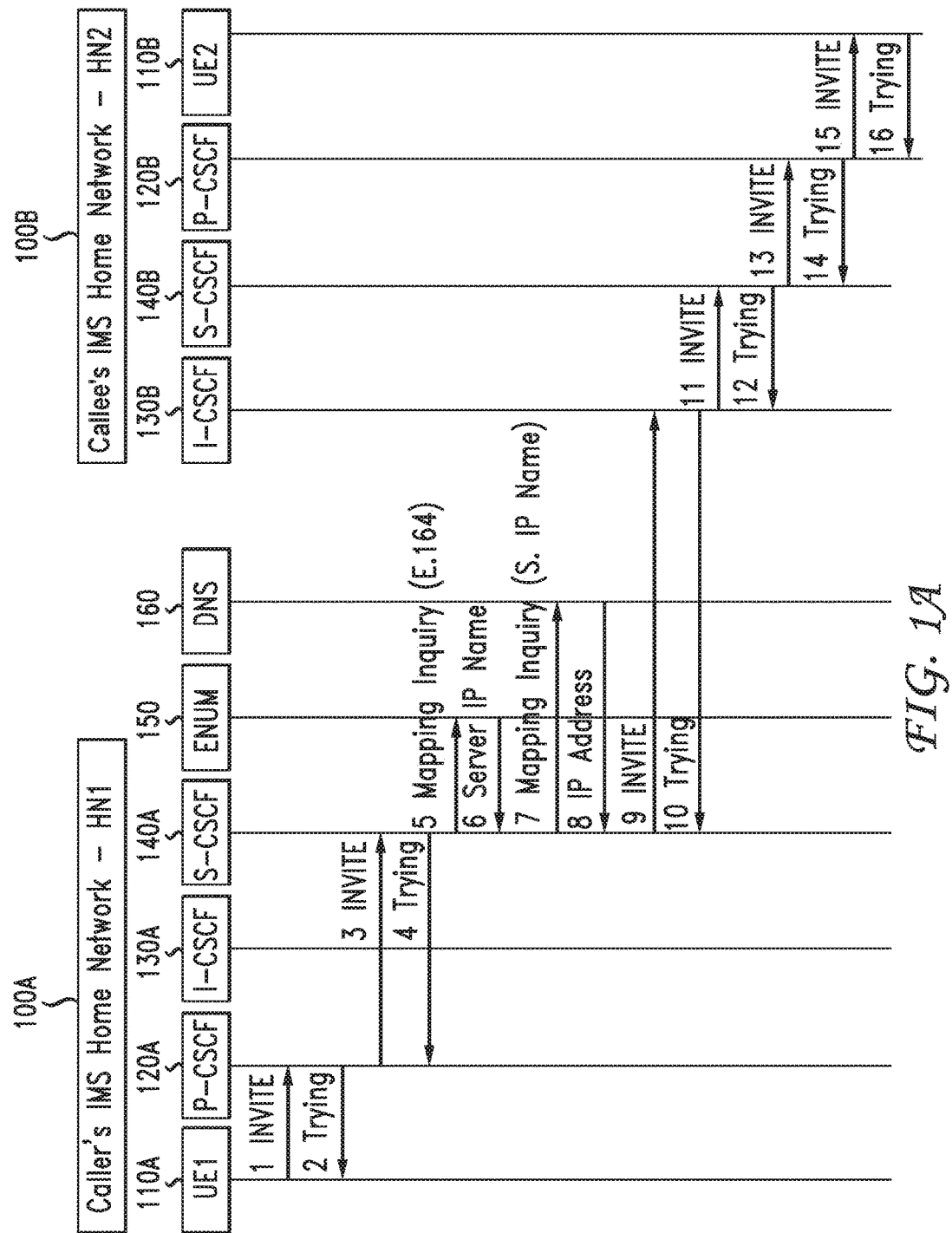
FIG. 1A illustrates a simplified message flow using a conventional ENUM, such as a physical ENUM (pENUM).

FIG. 1A illustrates a simplified typical message flow using ENUM. Those skilled in the art will appreciate that the message flow and accompanying description are simplified for ease of explanation.

In the description that follows, for illustrative purposes, the message flow is described as occurring between Internet Protocol (IP) Multimedia Subsystem (IMS) networks. IMS networks provide a standardized architectural framework for delivering IP multimedia services. It should be appreciated, however, that the embodiments described herein are not limited to implementation in IMS networks but are applicable to other networks having a session protocol suitable for delivering IP multimedia services.

The message flow shown in FIG. 1A occurs between components in a caller's IMS home network 100A and a callee's IMS home network 100B. As shown in FIG. 1A, the user end device 110A can send an invite message 1 to a Proxy-Call Session Control Function (P-CSCF) 120A to initiate a communication with the user end device 110B. The invite message 1 includes, e.g., a telephone number associated with the user end device 110B. The P-CSCF 120A returns a message 2 to the user end device 110A, indicating that the P-CSCF 120A is trying to set up the communication. The P-CSCF 120A can also send an invite message 3 to a Serving-Call Session Control Function (S-CSCF) 140A. The S-CSCF 140A can load subscriber information from an HSS (not shown) and can respond to the P-CSCF 120A with a message 4 indicating that the S-CSCF 140A is trying to set up the communication.

The S-CSCF 140A also sends a mapping inquiry 5 to the ENUM 150. The ENUM 150 can translate a form of the telephone number into one or more Name Authority Pointer (NAPTR) record(s) indicating the communication endpoints that may handle the communication. The ENUM 150 sends a message 6 with one of more NAPTR records, each of which can contain a server endpoint designator (IP name) to the S-CSCF 140A. The S-CSCF 140A, in turn, sends a mapping inquiry 7, including the server IP name to the DNS 160. The DNS 160 returns a message 8 with an IP address which may be used to reach the user end device 110B.

The S-CSCF 140A then sends an invite message 9 to the Interrogating Call Session Control Function (I-CSCF) 130B of the callee's network 100B. The I-CSCF 130B sends a message 10 to the S-CSCF 140A, indicating that the I-CSCF 130B is trying to set up the communication.

The I-CSCF 130B then sends an invite message 11 to the S-CSCF 140B, which responds with a message 12 indicating that the S-CSCF 140B is trying to set up the communication. The S-CSCF 140B, in turn, sends an invite message 13 to the P-CSCF 120B, which responds with a message 14 indicating that the P-CSCF 120B is trying to set up the communication. Finally, the P-CSCF 120B sends an invite message 15 to the user end device 110B, and the user end device 110B responds with a message 16 indicating that it is trying to answer the calling application. Once the communication is established, the call is routed via the Internet, over caller's home network 100A and the callee's home network 100B.

Figure 1B:
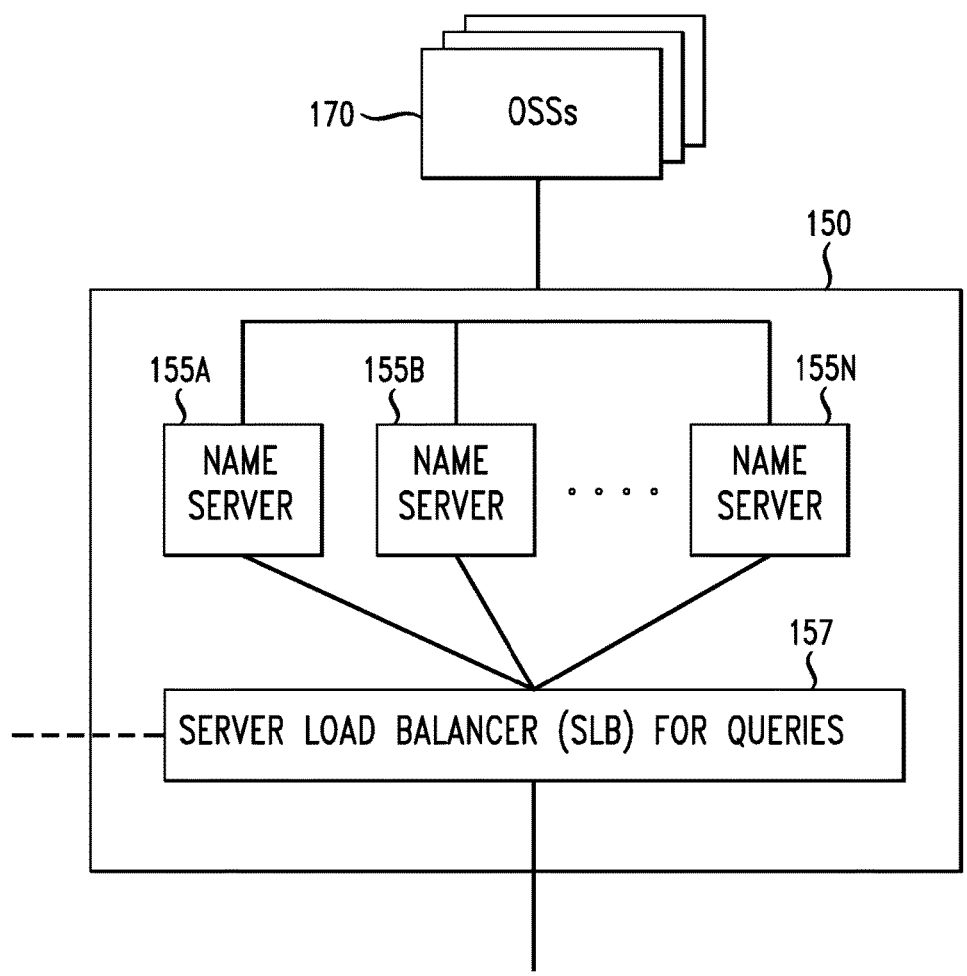
FIG. 1B illustrates a conventional pENUM zone according to an illustrative embodiment.

An example of a pENUM is shown in FIG. 1B. The pENUM 150 shown in FIG. 1B represents a pENUM site. A pENUM site is divided or partitioned into a number of Name Server (NS) instances, where each NS instance can be dedicated to a specific number range of telephone numbers. There can be more than one NS instance for a given range of telephone numbers.

Referring to FIG. 1B, the pENUM zone 150 includes a plurality of name servers 155A, 155B, . . . , 155N, each dedicated to a different instance of the pENUM 150. Each instance of the pENUM 150 is dedicated to a range of telephone numbers. The number range of each instance is limited based on the capacity of the name server dedicated to that instance.

The pENUM 150 also includes a server load balancer 157. The server load balancer 157 receives requests from clients, e.g., the S-CSCF 140A, and routes the requests to the appropriate name server based on the number range associated with the request. The server load balancer 157 also provides responses to clients, e.g., the S-CSCF 140A. Provisioning of the pENUM 150 can be handled by one or more Operations Systems Servers (OSSs) 170. Although not shown, it should be appreciated that the pENUM 150 may also include a data repository for storing data related to provisioning, etc.

While physical ENUM instances have been deployed across the globe, the new industry trend is to migrate towards virtualized cloud platform environments, where virtual machines are used to host one or more services. Virtual machines are software abstractions of physical machines. Multiple virtual machines share the same physical hardware resources. Virtual machines can be hosted in infrastructures that are sometimes referred to as "clouds".

In a virtualized computer system, a given computer having one type of CPU, called a host, includes an emulator program, referred to as a hypervisor that allows the host computer to emulate the instructions of a related or possibly unrelated type of CPU, called a guest. The host computer executes an application that will cause one or more host instructions to be called in response to a given guest instruction. The host computer can run both software designed for its own hardware architecture and software written for a guest computer. A guest computer can run its own operating system. In this type of arrangement, the guest computer system is a "virtual machine" as it only exists in the host computer system as a pure software representation of the operation of a specific hardware architecture.

Figure 2:
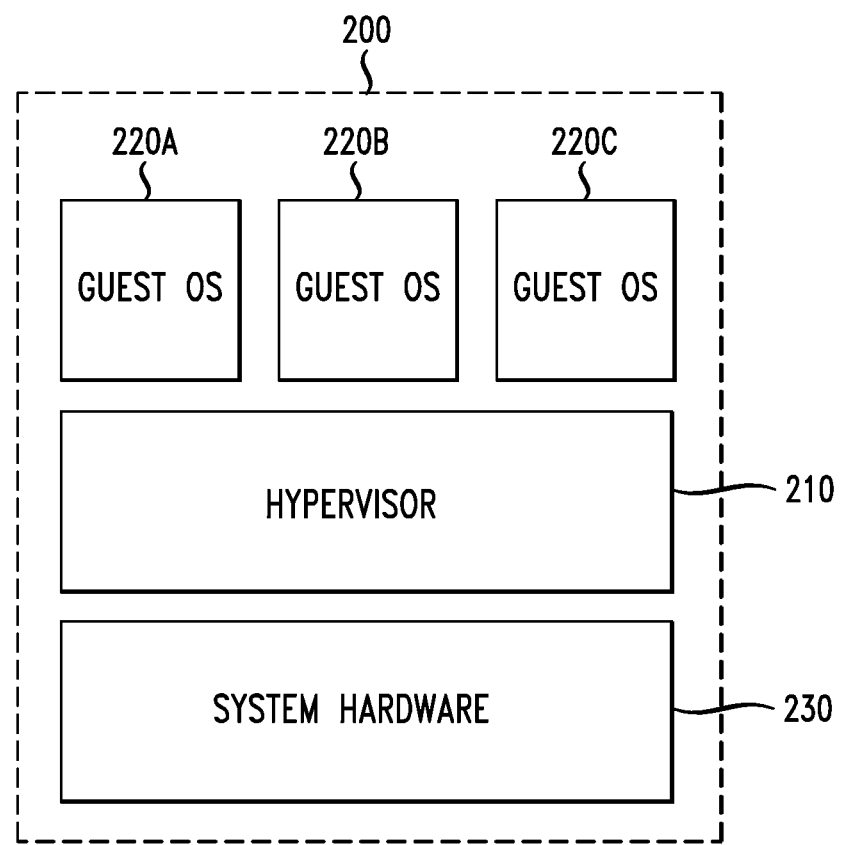
FIG. 2 illustrates an example of a virtual machine.

FIG. 2 is a diagram representing an illustrative example of a virtualized computer system. As shown in FIG. 2, the virtualized computing system includes a host computing device 200 including a hypervisor layer, a virtualization layer, and a hardware layer.

The hypervisor layer includes a hypervisor 210 that allows and manages access to a number of physical resources in the hardware layer (e.g., processor, memory, and hard drive) by at least one virtual machine executing in the virtualization layer. The hypervisor 210 functions as a software-based hardware abstraction layer that controls physical resources and firmware resources of the virtual hardware. The virtualization layer includes virtual or guest machines 220A, 220B, and 220C which may include virtual operating systems and virtual hardware resources, e.g., a processor, a virtual hard drive, a virtual memory, etc. The hypervisor 210 allows each guest operating system 220A, 220B, and 220O to interact with the virtual hardware.

The hardware layer includes physical system hardware 230 including, e.g., a hard drive for storing data, a processor for executing applications, and a memory which may include an operating system which controls scheduling of tasks and access to system resources.

Given the large numbers of subscribers and the fact that the ENUM records must be maintained in memory for real-time session initiation, ENUM is a memory-intensive application. It would be beneficial to virtualize ENUMs to conserve resources and create an ability to adjust the system ENUM resources based on the potentially time-varying load demands of ENUM. However, simply virtualizing a pENUM would not be sufficient to handle the challenges faced by service providers, as the number of subscribers and the memory capacity of virtual machines differ from one service provider to another.

According to illustrative embodiments, virtual ENUMs (vENUMs) are instantiated in a manner that is elastic, allows for easy migration to and from pENUMs and vENUMs, and maximizes the use of vENUMs without instantiating vENUMs unnecessarily. Also, the embodiments described herein allow for an incremental migration from pENUMs to vENUMs, which is important as the industry slowly migrates towards a virtualized environment.

Figure 3A:
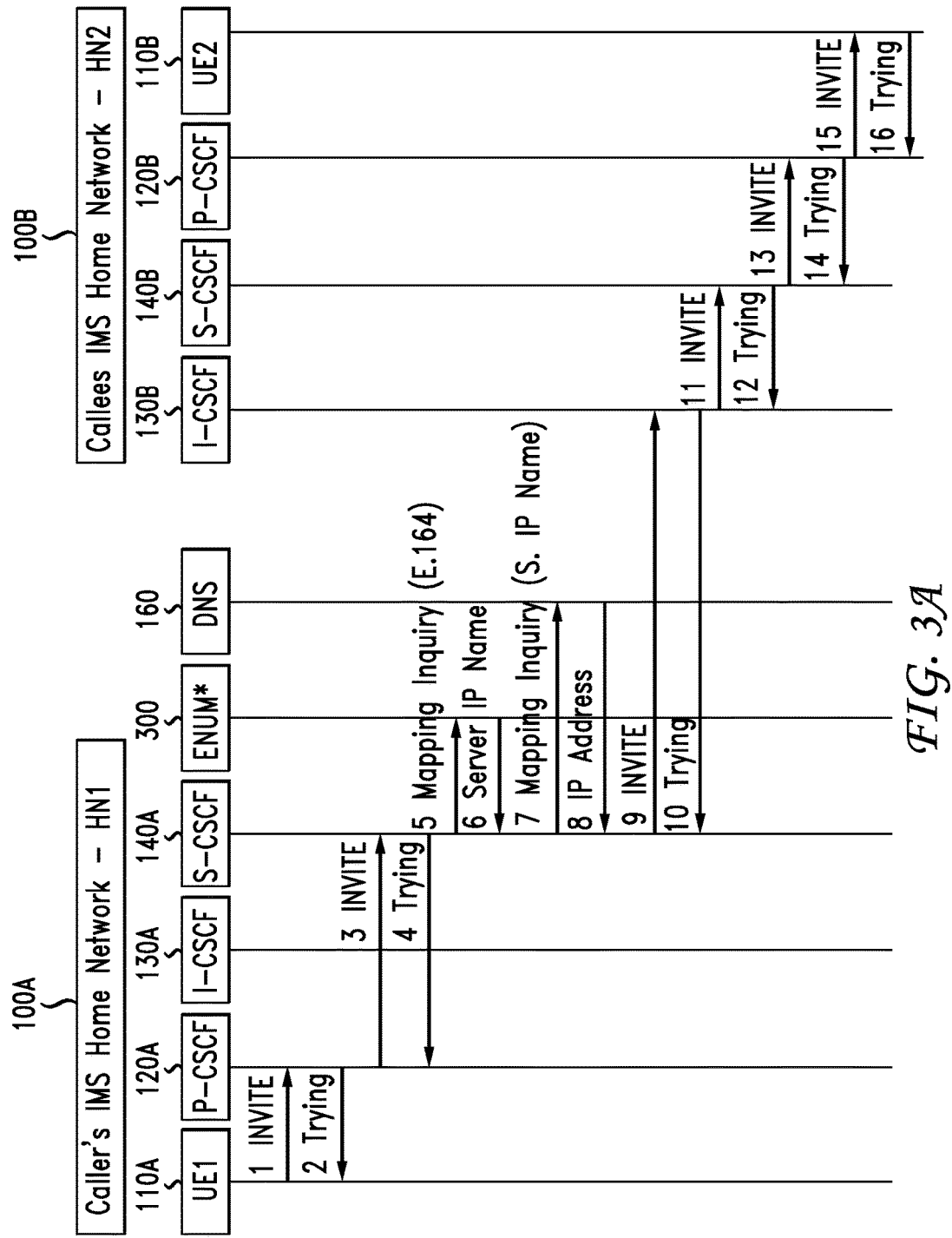
FIG. 3A illustrates a simplified message flow using an ENUM service including virtual ENUM (vENUM) instances and physical ENUM (pENUM) instances according to an illustrative embodiment.

FIG. 3A illustrates a simplified message flow using a dual provisioned pENUM and vENUM system according to an illustrative embodiment. The message flow of FIG. 3A is similar to that of FIG. 1A, except that queries from the S-CSCF 140A are handled by an ENUM* 300 that includes one or more vENUM instances and pENUM instances as explained in further detail below. From the perspective of the S-CSCF 140A and the DNS 160, the ENUM* 300 appears to operate in the same manner as a conventional physical ENUM 150. Thus, in the interest of simplicity of explanation, the description of the message flow is not repeated here. However, it should be appreciated that the ENUM* 300 has several advantages in terms of resource conservation and flexibility that cannot be achieved using the conventional physical ENUM 150.

Figure 3B:
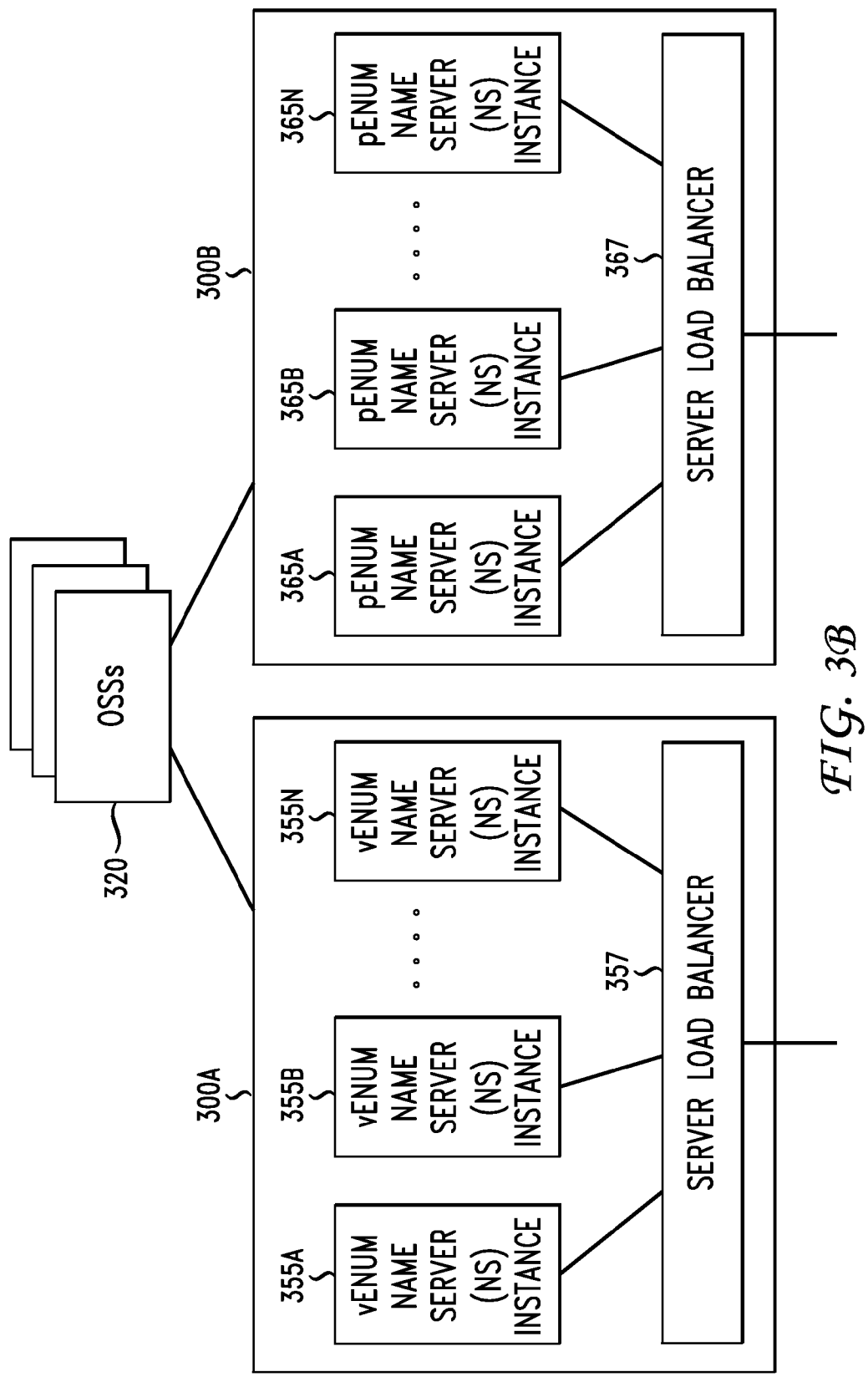
FIG. 3B illustrates ENUM sites including a vENUM site and a pENUM site according to an illustrative embodiment.

FIG. 3B illustrates a system including a vENUM site 300A and a pENUM site 300B. Both sites may be considered part of the ENUM* 300. As noted above, the pENUM site can be divided or partitioned into NS instances, each NS instance dedicated to a specific number range. Similarly, the vENUM site is divided into virtualized NS instances, each instance dedicated to a specific number range.

As shown in FIG. 3B, the vENUM site 300A includes vENUM instances 355A, 355B, . . . , 355N. Each vENUM instance includes a name server that is dedicated to a partition of the pENUM data, each partition being associated with a specific number range.

Similarly, the pENUM site 300B includes pENUM instances 365A, 365B, . . . , 365N. Each pENUM instance includes a name server that is dedicated to a specific number range.

As noted above, the number range served by a name server is limited based on the capacity of the name server. A pENUM name server may have more capacity than a vENUM name server. Thus, there may be many vENUM instances dedicated to a specific number range that is served by a single pENUM instance.

Referring again to FIG. 3B, the vENUM site 300A includes a server load balancer 357 that receives requests from clients, e.g., the S-CSCF 140A, and distributes the requests among the vENUM NS instances 355A, 355B, . . . 355N, such that the traffic load is balanced among the vENUM NS instances. If one vENUM NS instance receives a request and cannot handle it, e.g., because it does not host that queried number range, the vENUM NS instance may forward the request to another vENUM NS instance that hosts the queried number range.

Similarly, the pENUM site 300B includes a server load balancer 367 that receives requests from clients, e.g., the S-CSCF 140B, and distributes the requests between the pENUM NS instances 365A, 365B, . . . , 365N and/or forwards the requests to the server load balancer 367 to be handled by a vENUM NS instance.

In FIG. 3B, one site of vENUM NS instances and one site of pENUM NS instances are shown. It should be appreciated that there may be a plurality of vENUM sites and pENUM sites, and the sites may be replicated across a network. For example, one vENUM zone may serve one metropolitan area, while another vENUM zone serves another metropolitan area. In a large scale cloud, there may be a large number (thousands or more) of various vENUM zones that are spread across a large number of hosts, interconnected by Transmission Control Protocol (TCP)/Internet Protocol (IP) transport or other protocols.

The Operational Support Systems (OSSs) 320 interact with the vENUM site 300A and the pENUM site 300B for provisioning, orchestration, performance monitoring, fault recognition, etc. The OSSs 320 are illustrated and described in more detail with respect to FIG. 3C.

Although not shown, it should be appreciated that the vENUM site 300A and the pENUM site 300B may each include a data repository for storing data regarding provisioned instances, such as the data shown in FIG. 6, described in more detail below.

Figure 3C:
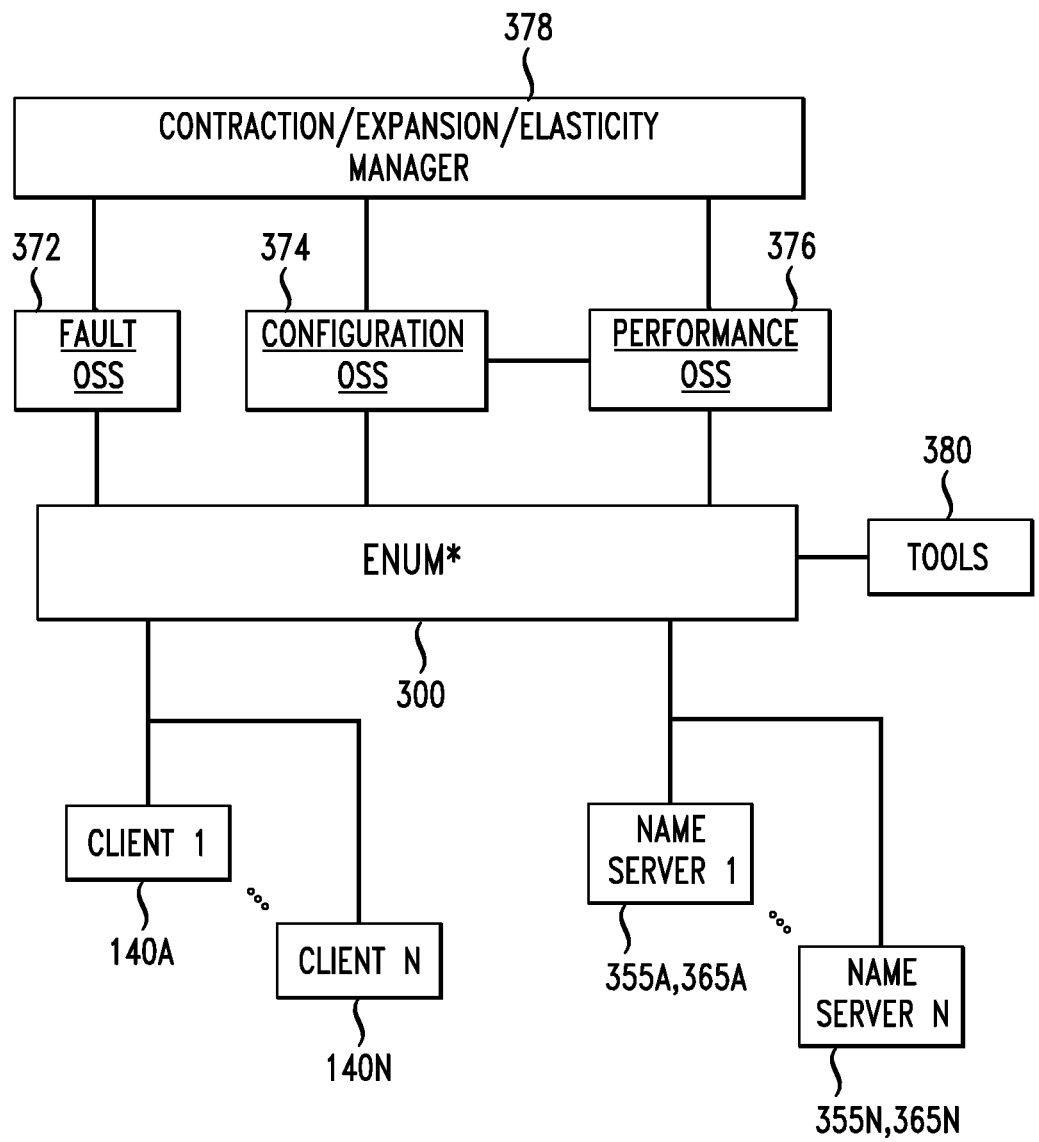
FIG. 3C illustrates an environment in which an ENUM zone (virtual or physical) may be implemented according to an illustrative embodiment.

FIG. 3C illustrates a system including an ENUM* instance which may be a vENUM instance or a pENUM instance according to an illustrative embodiment. In FIG. 3C, the ENUM* instance 300 receives and responds to queries from clients 1-N, e.g., queries from the S-CSCF 140A. The ENUM* includes one or more name server(s) for handling requests. The ENUM* 300 may also forward the request to another name server, e.g., name servers 1-N. The name servers 355A-N may be included in a vENUM site, and the name servers 365A-N may be included in a pENUM site.

The OSSs 320 include systems for configuring and orchestrating the vENUM instances and the pENUM instances. For example, the OSSs 320 may include a Fault Detecting OSS 372 for detecting faults and failure of components of vENUM and/or pENUM sites and initiating recovery and/or migration to other instances (physical and/or virtual). The OSSs 320 may also include a Configuration OSS 374 which communicates with the server load balancers 357 and 367 regarding provisioned instances (including vENUM and pENUM instances) and populates data regarding the provisioned instances in a data repository (not shown). The Fault Detecting OSS 372 may be in communication with the Configuration OSS 374 for facilitating recovery and/or migration to other instances.

The OSSs 320 may also include a Performance Monitoring OSS 376 and a Contraction/Expansion/Elasticity Manager 378. The Performance Monitoring OSS 376 monitors the performance of the ENUM* 300 in terms of capacity and detects when the ENUM* 300 is operating at maximum threshold, indicating that more capacity is needed, or at a minimum capacity, indicating that perhaps the ENUM* 300 is being underutilized.

The Performance Monitoring OSS 376 provides performance metrics to the Configuration OSS 374 and the Contraction/Expansion/Elasticity Manager 378. The Contraction/Expansion/Elasticity Manager 378 makes decisions regarding instantiation of new vENUM instances, removal of vENUM instances, and re-instantiation of removed vENUM instances, depending on the load on the vENUMs as indicated by the performance metrics. Also, the Contraction/Expansion/Elasticity Manager 378 may make decisions regarding instantiation, removal, and reinstantiation based on faults detected by the Fault Detecting OSS 372. Instances of vENUMs may be incrementally added and removed, as needed. The Configuration OSS 374 may change the configuration of pENUM instances and/or vENUM sites based on performance metrics reported by Performance Monitoring OSS 376 and based on the decisions made by the Contraction/Expansion/Elasticity Manager 378.

In addition to the Performance Monitoring OSS 376, there may also be tools 380 which monitor the performance metrics of the ENUM* 300 for other purposes, e.g., call traffic statistics.

According to one embodiment, techniques and mechanisms are provided for instantiating vENUM sites, for VMs which may have any one of several "flavors." Instantiating flavors of vENUM sites allows for ENUM virtualization for a variety of target platforms. It also allows infeasible vENUM orchestration to be bypassed and allows for re-use of an existing pENUM.

Each service provider must accommodate a certain number of subscribers, and that number of subscribers may vary from one service provider to another. Also, the vENUM flavors available for instantiation may vary from one service provider to another. There are challenges in dealing with the different flavors of vENUMs, including how to automatically partition the service provider subscriber pool numbers, how many minimum vENUM instances to deploy, and how to map such partitions onto groups of vENUM NS instances.

To aid in understanding the challenges of instantiating vENUMs for a given service provider, consider the total number of telephone numbers that a service provider may need to store data for. Currently, for the 10 digits that are commonly used in North America for telephone numbers, the total number of telephone numbers for a service provider would require $10^{10}$ (10 trillion) records of data. Each record may consume, for example, 100 bytes of memory (or less or more, depending on the record and whether meta data or back-up data is included). With 100 bytes of memory needed to store each record, a storage capacity of about $10^{12}$ bytes would be required to store all the records for the subscribers for a given service provider. This is a hypothetical number which is intentionally high to illustrate the issue at hand, as opposed to exemplify the subscriber data for any specific service provider. A service provider may, for example, have only 125 million subscribers (resulting in $125 \times 10^8 = 11.64$ GBytes of needed storage).

Given the large number of subscribers for a service provider, which may differ from one service provider to another and may change for any given service provider at any time, a method of virtualizing a pENUM must be flexible. According to an illustrative embodiment, the challenges of virtualizing a pENUM are met by selecting appropriate flavors of available virtual machines for instantiation as vENUMs.

Figure 4A:
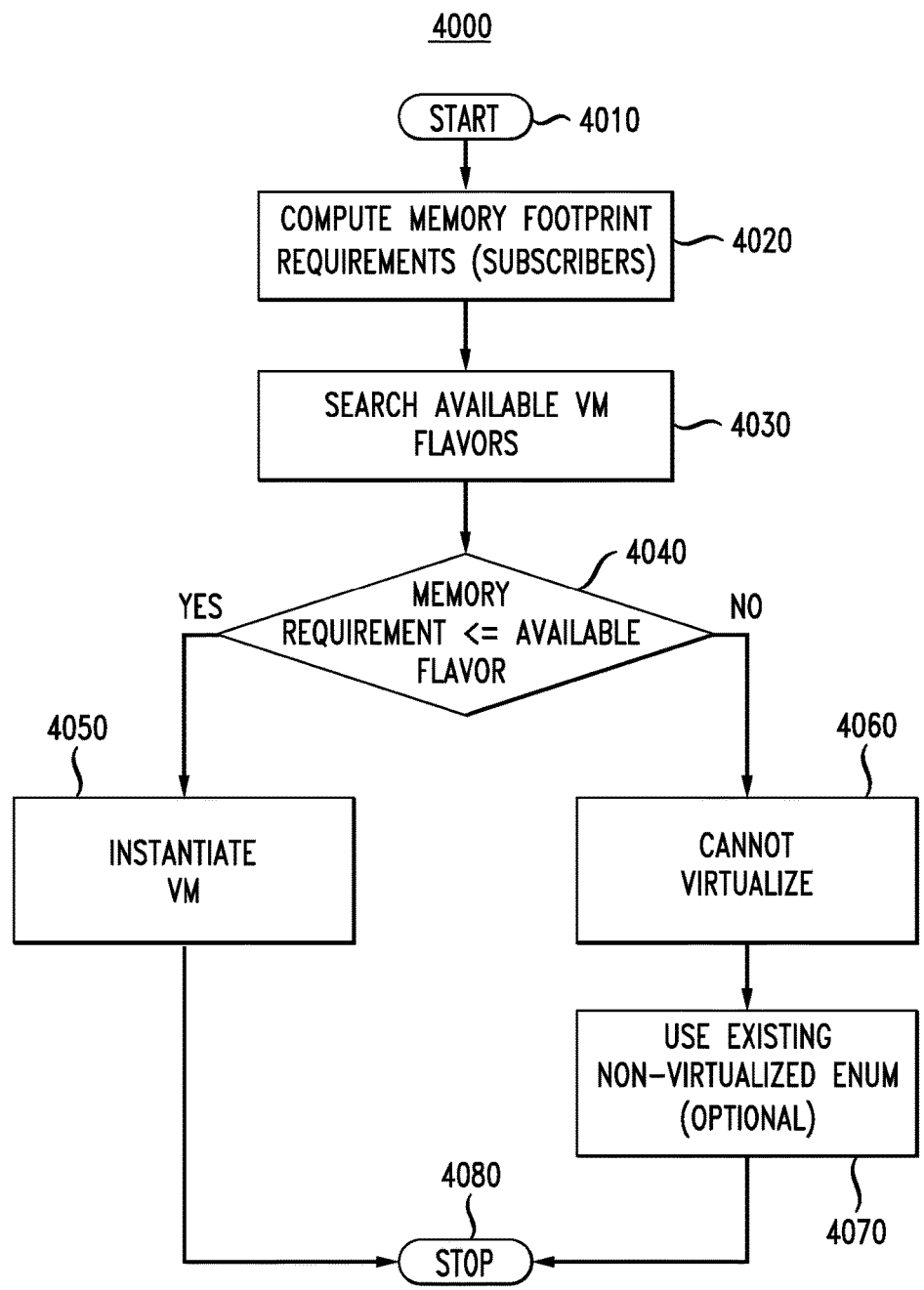
FIG. 4A illustrates a method for selecting a vENUM for instantiation according to an illustrative embodiment

FIG. 4A illustrates a method for virtualizing a pENUM according to an illustrative embodiment. At step 4020, the memory footprint requirements for responding to requests from subscribers using the pENUM are computed by an OSS, such as the Configuration OSS 374. At step 4030, the flavors of virtual machine instance available for instantiation as vENUM name servers are searched, e.g., by the Configuration OSS 374. Such flavors may be stored in a table, such as that shown in FIG. 5, for a given service provider. This data may be stored in a data repository, e.g., in the vENUM site and/or outside the vENUM site.

As shown in FIG. 5, the flavor table 500 includes an identification 510 of each available virtual machine flavor, a name of each virtual machine flavor 520, a memory capacity 530 of each virtual machine flavor, and an amount of disk space 540 provided by each virtual machine flavor. The table may also include other information of each virtual machine flavors, such as (but not limited to) a swap space 560 of each virtual machine flavor and performance characteristics, such as a number of virtual CPUs (vCPUs) 570 used by each virtual machine flavor.

As can be seen from FIG. 5, some virtual machine flavors, such as the virtual name flavor named m1.tiny, have very little memory capacity. This virtual machine flavor may be suitable for executing an application, such as a calculator, which requires only one vCPU. Other virtual machine flavors, such as m1.xlarge, may have a large memory capacity and may be suitable for executing applications requiring a greater number of CPUs. It should be appreciated that the flavors shown in the table in FIG. 5 are shown for illustrative purposes only. Virtual machine flavors may have other names, memory capacities, CPU performance characteristics, etc.

Referring again to FIG. 4A, at step 4040, a determination is made, e.g., by the Configuration OSS 374, whether the memory requirements needed to handle requests from users/subscribers is less than or equal to the available flavors of virtual machines. The memory requirements may be estimated, in part, based on a target number of subscribers.

If the memory requirements needed to serve the subscribers is less than or equal to the available flavors, one or more copies of the same virtual machine can be instantiated as a vENUM name server instances, e.g., by the Configuration OSS 374, at step 4050. Once each copy of the same vENUM name server instance is instantiated, data regarding each such copy of vENUM name server instance is populated in a table, such as that shown in FIG. 6 and described in detail below.

If the available flavors do not have sufficient memory capacity, the Configuration OSS 374 determines at step 4060 that a virtual machine cannot be instantiated to handle requests for the pENUM. As an optional step, the existing pENUM may be used to fulfill a request at step 4070. Step 4070 may be performed by an entity other than the Configuration OSS 374. The process ends at step 4080.

Each service provider that has a pENUM deployment and wants to transform such a deployment to a virtual environment, may encounter different virtualization environments and constraints. As noted above, the virtual machine flavors vary from one service provider to another. A one-to-one mapping of the existing pENUM instances to vENUM instances may or may not be feasible.

Telephone numbers are partitioned for various sizing purposes. Telephone numbers can be partitioned based on various groupings of digits. For example, telephone numbers may be grouped by area codes.

Some of the data of a pENUM site may be partitioned based on telephone number ranges. For example, each pENUM NS instance may serve a number of area codes, and different pENUM NS instance sets (one or more name servers) may be dedicated to telephone numbers having a particular area code. For example, telephone numbers with area codes between 200 and 999 may be further divided into, e.g., five partitions, with a set of (one or more) pENUM NS instances dedicated to each such partition (for example, area codes 200 to 360 for one partition, area codes 361-520 to another partition, and so on). According to an illustrative embodiment, partitioning of the pENUM telephone number range data is used for automatic mapping of a pENUM NS instances to one or more name servers in one or more virtualized vENUM sites.

Figure 4B:
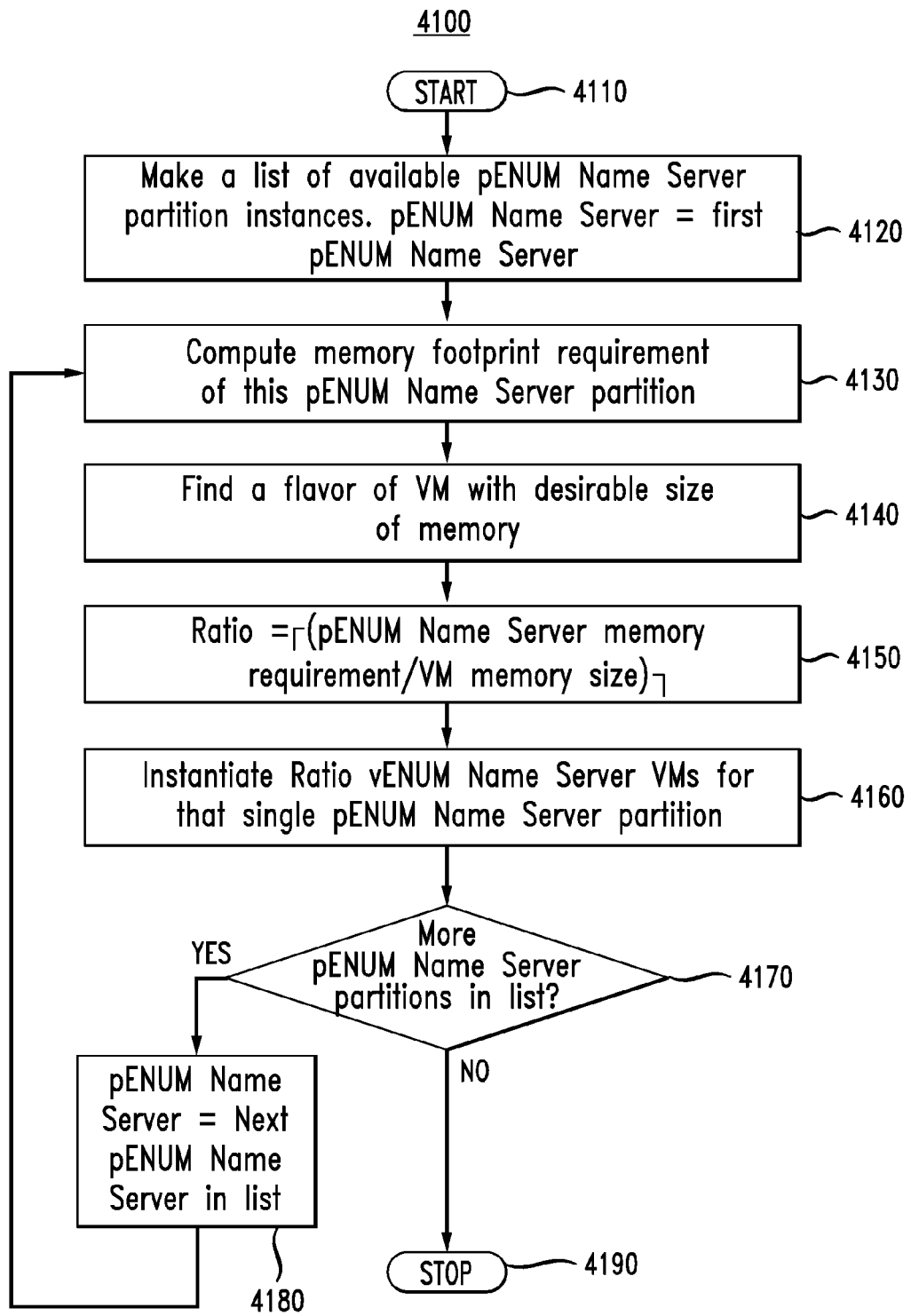
FIG. 4B illustrates a method for associating vENUMs with partitions of a pENUM according to an illustrative embodiment.

FIG. 4B illustrates a method for associating vENUMs with partitions of a pENUM NS according to an illustrative embodiment. Referring to FIG. 4B, the process starts at step 4110. At step 4120, a list of existing pENUM NS partitioned instances is made. This listing may be made by, e.g., the Configuration OSS 374.

Beginning with a first pENUM NS instance, at step 4130, the memory footprint of that pENUM instance is computed, e.g., by the Configuration OSS 374, as a function of the number of telephone numbers that can fit in the number range to which the pENUM NS instance is dedicated. For example, the memory required to handle requests for telephone numbers beginning with a particular area code may be determined based on a target number of expected number of subscriber records and/or requests for those telephone numbers. If more than one instance of a pENUM NS instance is used for a target range (e.g., for performance and/or reliability purposes), information about one of them (e.g., the one with the largest amount of resources, or the one with the smallest amount of resources, depending on the preferences, if they are unequal) may be sufficient for this computation. For the purposes of this disclosure, it should be appreciated that the term "memory" includes not only capacity in terms of bytes but also disk space.

At step 4140, a "suitable" virtual machine flavor is selected, e.g., by the Configuration OSS 374, from among the list of available virtual machine flavors. A "suitable" virtual machine flavor may be determined based on any desirable criteria such as, for example, the virtual machine flavor having the largest memory capacity. Other variants of a definition for "suitable" are not excluded.

At step 4150, a ratio of the memory required by a pENUM NS instance to handle requests to the memory capacity of a virtual machine flavor is computed, e.g., by the Configuration OSS 374. This ratio is indicative of the number of virtual machine instances that would be needed to handle requests associated with the number range to which the pENUM NS instance is dedicated. According to an illustrative embodiment, this ratio may be a "ceiling ratio", such that if the ratio is a fraction, the ratio is rounded up to the next integer.

According to an illustrative embodiment, different virtual machine flavors may have different amounts of memory in terms of bytes and disk space. Thus, at step 4150, different ratios may be computed for determining the number of virtual machine instances needed to accommodate the amount of memory in bytes of the pENUM NS instance and for determining the number of virtual machine NS instances needed to accommodate the disk space of the pENUM instance. If the number of virtual machine instances needed for the virtual machine flavor to accommodate the memory in bytes of the pENUM instance is not the same as the number of virtual machine instances computed to accommodate the disk space of the pENUM, the greater of the determined number of virtual machines instances needed may be selected, e.g., by the Configuration OSS 374.

At step 4160, for a selected pENUM NS, instantiation of each vENUM NS instance is started, e.g., by the Configuration OSS 374. Information about the data that may be allocated to each vENUM NS instance can be passed, e.g., to the server load balancers 357 and 367. Such information may also be stored in a data repository in the pENUM. Such information may include, e.g., information about the specific range of telephone numbers that were allocated to that pENUM NS instance that are allocated to a particular vENUM NS instance. More than one copy of a unique vENUM NS instance may be started (for example, for reliability and/or performance reasons). An example of the information that may be stored for a vENUM NS instance copy is shown in FIG. 6 and described in more detail below.

At step 4170, a determination is made, e.g., by the Configuration OSS 374, whether there are any more pENUM NS instances in the list of partitioned pENUM instances. If so, the process returns to step 4130, and the steps are repeated. Otherwise, the process ends at step 4190.

Having described virtualization of pENUM name servers, the following is a description of the orchestration of an environment including vENUMs and pENUMs. Orchestration activities for virtualizations are complex, involve numerous steps, and such steps are inter-dependent. According to an illustrative embodiment, orchestration of vENUM deployment is achieved in a manner that allows for incremental virtualization and dynamic migration between a pENUM environment and a vENUM environment.

Figure 4C:
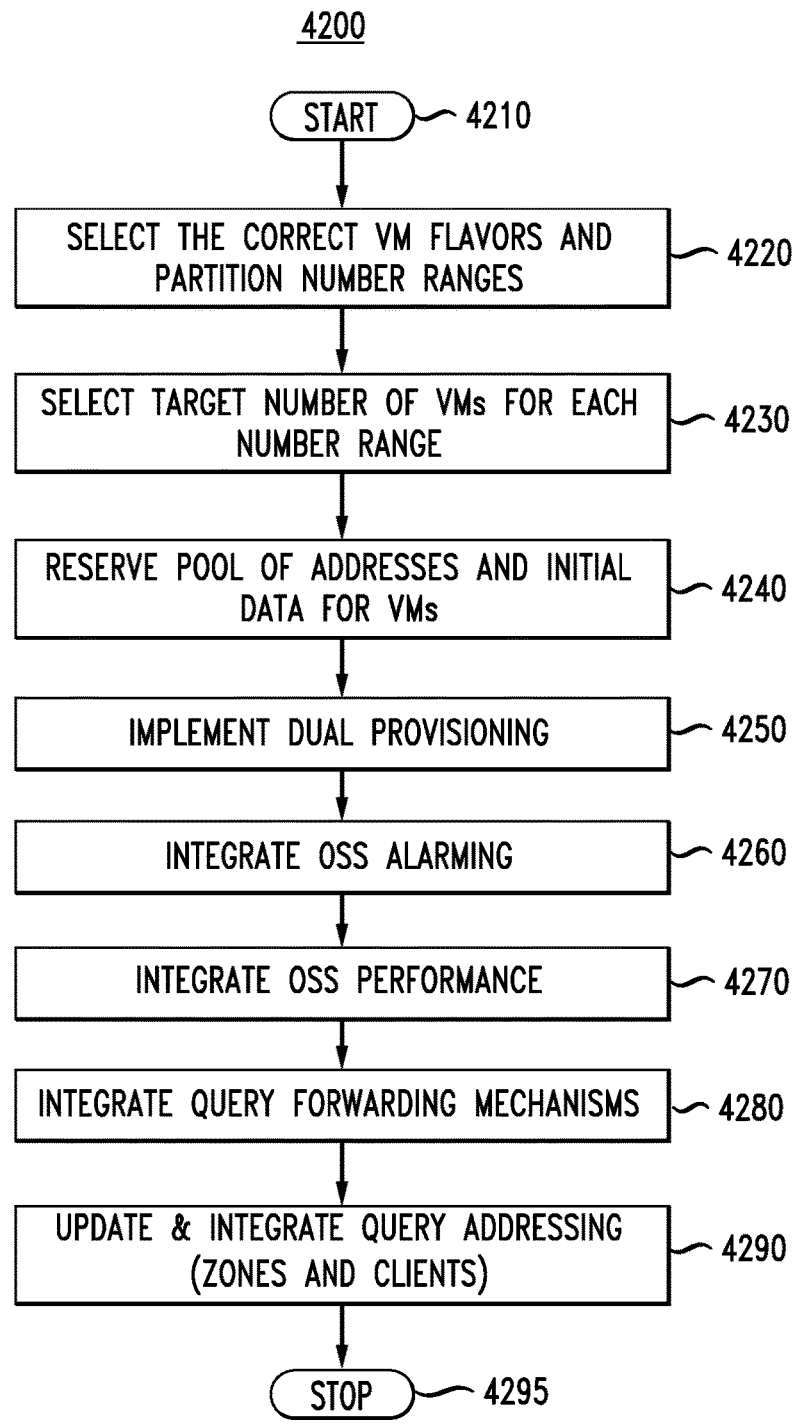
FIG. 4C illustrates a method for orchestrating vENUM deployment according to an illustrative embodiment.

FIG. 4C illustrates a method for orchestrating vENUM deployment according to an illustrative embodiment. Referring to FIG. 4C, the process starts at step 4210. At step 4220, the number ranges of the pENUM NS are partitioned, and the flavors of virtual machine instances are selected, e.g., as described above with reference to FIGS. 4A and 4B. At step 430, target numbers of virtual machine instances are selected (computed) for each number range, e.g., as described above with reference to FIG. 4B. These steps may be performed, e.g., by the Configuration OSS 374. According to an illustrative embodiment, a target number of virtual machine instances is selected for each number range. This selection may be made based on the experience with the performance of the target virtual machines in response to an expected range (or maximum) number of queries for the target ENUM environment (including physical and virtual ENUMs).

Once a minimum number of such virtual machines needed to handle requests for the pENUM has been selected, initial data is reserved and stored in a data repository for each vENUM NS instance at step 4240. An example of a minimum number of copies of any started vENUM NS instance in a sample environment may be 3, where service may be sustainable with sufficient performance, even one or two of such copies experience difficulties and/or is (are) otherwise compromised. This step may also be performed, e.g., by the Configuration OSS 374. This data may include IP addresses for the vENUM NS instances and other data, such as that depicted in FIG. 6 and described in more detail below.

Next, dual provisioning is implemented, e.g., by the Configuration OSS 374 at step 4250. This involves duplicating new provisioning information to one or more vENUM sites and any existing pENUM sites, such as those depicted in FIG. 3B. It should be noted that, if there is at least one pre-existing pENUM site, new provisioning can be suspended and data from any such pENUM site can be copied over to the corresponding vENUM sites.

Next, at step 4260, fault detection and alarms are integrated for the updated deployment of vENUMs and pENUMS by the Fault Detection OSS 372 to detect failures in vENUM and pENUM performance and produce alarms. At step 4270, performance monitoring of the updated deployment of vENUMs and pENUMs is integrated by the Performance Monitoring OSS 376.

A query forwarding mechanism for the existing deployed name servers can be updated to integrate the new vENUM name servers of vENUM sites at step 4280. This may involve the Configuration OSS 374 instructing any or all name servers 355A, 355B, . . . 355N, 365A, 365B, . . . 365N and/or the server load balancers 357 and 367 to forward queries as desired. For example, pENUM NS instances may be configured to just forward queries to corresponding vENUM NS instances 355A-N as records for each number range populated in the correct vENUM NS instances 355A-N.

Finally, the new vENUM zone(s) can be updated to advertise their addresses (e.g., using an AnyCast address that can be shared with the pENUM sites) at step 4290. This step may be performed by the Configuration OSS 374. As migration occurs from a pENUM to a vENUM, the name server in the pENUM needs to be modified to indicate that migration is complete. Alternatively, or in addition, the clients (e.g., the S-CSCF 140A) can be updated to incorporate the query address(es) of the new virtual site. The process ends at step 4295.

Having described how pENUM name server and vENUM name server instances are instantiated and how such instantiation is orchestrated such that the pENUM and vENUM environments may exist in parallel, it is important to understand how to handle migration from a pENUM environment to a vENUM environment in an incremental fashion, such that service is not disrupted.

As various pENUM deployments exist in the world, and virtualization is gaining popularity worldwide, there is a challenge in introducing new vENUM deployments without impacting the existing pENUM services. According to an illustrative embodiment, techniques and mechanism are provided for integrating the pENUM and vENUM environments. Migration of data from the pENUM environment to the vENUM environment may occur incrementally with seamless interoperation between the pENUM and vENUM deployments during and after the incremental migration and integration period. New vENUM instances can be deployed dynamically, alongside existing pENUM deployments. This allows the load to be shared without interruption for the clients (e.g., UE1 110A in FIG. 1A).

As described above, in a pENUM environment, telephone number ranges can be grouped into various partitions. Each partition is often handled by a group of pENUM name servers. If a pENUM name server receives a request associated with a telephone number range that it is not assigned to handle, the pENUM name server forwards that request to the pool of name servers which host that number range.

As further described above, as vENUM name server instances are deployed, a given telephone number range in a pENUM name server can be mapped to one or more vENUM name server instances. A pENUM name server may forward a request associated with a specific telephone number range to a vENUM name server instance that is provisioned to handle requests associated with that telephone number range. Until vENUM deployment is complete, a pENUM name server must decide whether to handle the request or to forward the request to a vENUM name server instance.

Figure 4D:
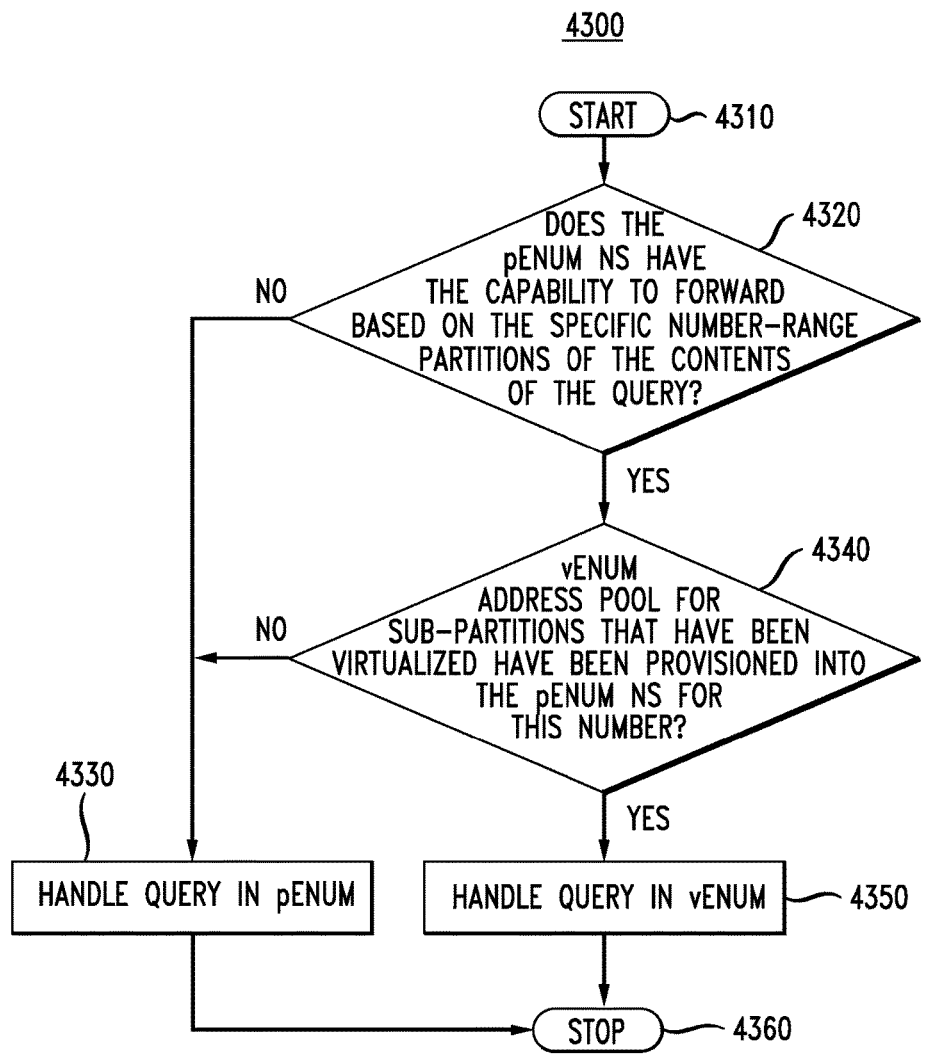
FIG. 4D illustrates a method for determining whether to forward a request from a pENUM name server to a vENUM name server according to an illustrative embodiment.

FIG. 4D illustrates a method for determining whether to forward a request from a pENUM name server to a vENUM name server according to an illustrative embodiment. The process 4300 begins at step 4310. At step 4320, a determination is made whether a pENUM name server, such as any of the pENUM name servers 365A, . . . , 365N, receiving a request for communication services has the capability to forward the request to a vENUM name server, such as any of the vENUM name servers 355A, . . . , 355N, based on the specific telephone number range associated with the request. This determination is made based on directives stored in a database of the pENUM name server indicating whether a request associated with the specific telephone number range should be forwarded.

For example, the directives may indicate that requests associated with some telephone number ranges should be forwarded, while requests associated with other telephone number ranges should not be forwarded. These directives may be provided to the pENUM name server by the service provider and may be updated, e.g., as vENUM name server instantiation is completed for various telephone number ranges.

If, at step 4320, a determination is made not to forward the request to a vENUM name server, the process proceeds to step 4330, and the request is handled by the pENUM name server. Handling of the request may involve the pENUM name server responding to the request if telephone number range associated with the request is assigned to the pENUM name server. Otherwise, the pENUM name server may forward the request to another pENUM name server that is assigned to the telephone number range associated with the request.

If, at step 4320, a determination is made to forward the request, the process proceeds to step 4340 at which a determination is made whether a vENUM name server instance has been provisioned to handle requests associated with the specific telephone number range. This may involve determining whether the vENUM address pool for sub-partitions that have been virtualized have been provisioned into the pENUM name server for the specific telephone number associated with the request. If not, the request is handled by the pENUM at step 4330. Otherwise, the pENUM name server forwards the request to one or more vENUM name server instances which have been provisioned to handle requests for the specific telephone number range, and the request is handled by a vENUM name server instance at step 4350. Steps 4320 and 4340 have been shown separately for clarity, and can be implemented in a single combined step.

Once the full telephone number space is configured into a vENUM deployment, requests for communication services may be directed toward the vENUM Server Load Balancers, e.g., vENUM Service Load Balancer 357, and the process described above will no longer be needed. Instead, all requests will be handled by vENUM name servers. This is based on the assumption that, until full migration to the vENUM environment occurs, relevant query response data can be provisioned in both the pENUM and vENUM deployments while both deployments are in use. For example, if a group of telephone numbers are to be turned on in the vENUM environment, a copy of the configured telephone numbers can be made into the vENUM environment, and subsequent data changes can be made into both the pENUM environment and the vENUM environment for data consistency.

The process of determining whether to forward a request as described above is flexible enough to integrate an existing pENUM deployment with a vENUM deployment on an incremental basis. At the completion of the provisioning of both deployments, both deployments can be operational and one deployment (e.g., pENUM) can be removed without service interruption.

It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a transitory or a non-transitory computer-readable medium.

It should further be understood that any mention of a specific virtualization platform is for exemplification purposes only, and does not imply limitations of selections.

According to illustrative embodiments, instantiation of new vENUM zones is orchestrated in a manner that allows for integration with pre-existing pENUM deployments. In the competitive world of multimedia IP solutions with the new trend towards improved infrastructure resiliency and costs structures through virtualization, the embodiments described herein are beneficial to service providers and vendors globally.

It should be appreciated that this orchestration may be part of a larger orchestration, whereby a vENUM is instantiated if possible; but the orchestration scenario can opt to complete the over-all orchestration procedure by reusing an existing non-virtualized pENUM. The embodiments described herein allow for deployment of the larger virtualization by dynamically bypassing an infeasible provisioning of a vENUM based on an attribute, e.g., memory size, that is a key property of a pENUM.

Virtual machine orchestration and other information can be maintained in a variety of fashions. An abstraction of some of the data, which may be used with an orchestration environment for a vENUM is shown in FIG. 6.

FIG. 6 illustrates a table listing an example of data that may be collected for an instantiated vENUM according to an illustrative embodiment. The data is shown in tabular format with one row for simplicity, where the row represents data for a single vENUM NS instance. It should be appreciated that many such rows of data may be maintained in one or more data repositories for each vENUM instance. Such data repositories may be maintained, e.g., in a pENUM site, vENUM site and/or outside such sites.

Referring to FIG. 6, various individual elements of each instantiated vENUM virtual machine may be maintained. The example data 600 includes an identification of a started image 610 of a copy of the vENUM NS instance, where such identification may, for example, include site information, process identifier and/or other information such as a number range. The data also includes an identification of the vENUM flavor 620. The data also includes initial data parameters 630, e.g., the number range, the IP address, etc., assigned to the vENUM instance. The data further includes an identifier 640 of the specific vENUM NS instance and performance metrics 650. The performance metrics may include references to resource utilization indicating the load on a vENUM NS instance at any given time. It should be appreciated that other data 660 may be maintained for each vENUM NS instance. Examples of such data may include numbers of incorrect queries, numbers of unsuccessful searches, etc.

Figure 7:
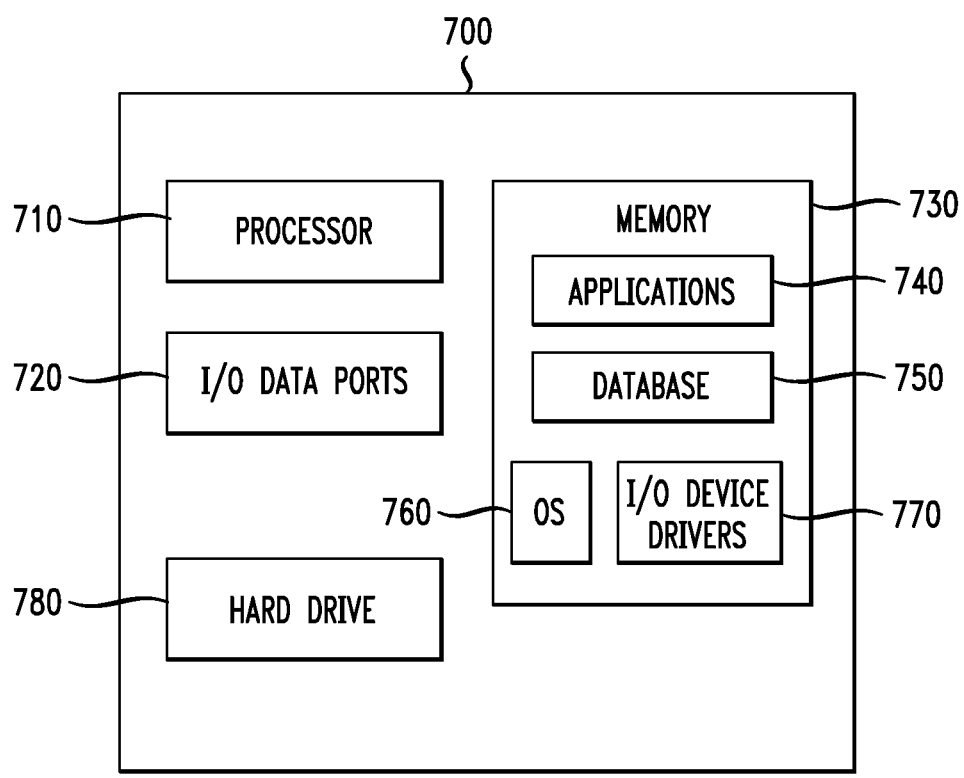
FIG. 7 illustrates a block diagram of a computing device with which various components described herein may be implemented according to an illustrative embodiment.

FIG. 7 is a block diagram of a computing device with which various components described herein may be implemented. According to one embodiment the computing device 700 represents a name server, such as the pENUM name servers 365A, . . . , 365N. Although no connections are shown between the components illustrated in FIG. 7, those skilled in the art will appreciate that the components can interact with each other via any suitable connections to carry out device functions. According to another embodiment, the computing device 700 can represent an OSS, such as the Fault Detection OSS 372, the Configuration OSS 374, the Performance OSS 376 and/or the Contraction/Expansion/Elasticity OSS 378. According to yet another embodiment, the computing device 700 can represent a server load balancer such as the server load balancers 157, 357, and 367.

It should be understood that FIG. 7 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, include non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the components shown in FIG. 7.

According to an illustrative embodiment, the computing device 700 may be implemented in any suitable computing device and on any suitable network. For example, the computing device 700 may be implemented as a server in a cloud in communication with vENUMs, pENUMs, and the OSS's over a communication network.

Referring to FIG. 7, the computing device 700 includes a processor 710. The processor 710 can be any commercially available or custom microprocessor. Although only one processor is shown for simplicity of illustration, it should be appreciated that there may be multiple processors, which could include distributed processors or parallel processors in a single machine or multiple machines. The processor 710 may be used in supporting a virtual processing environment. Also, the processor may include a state machine, an application specific integrated circuit (ASIC), programmable gate array (PGA) including a Field PGA, or state machine.

The processor 710 executes instructions stored in the memory 730 to perform operations. It should be appreciated that performance of these operations may include the processor 710 performing the operations directly and/or facilitating, directing, or cooperating with another device or component to perform the operations.

Referring again to FIG. 7, a processor 710 communicates information among pENUMs, vENUMs and/or OSSs via I/O Data Ports 720. This may include, for example, forwarding NS queries from one NS instance copy to another, communicating information indicative of performance of the vENUMs and pENUMs to an OSS (such as the Performance Monitoring OSS 376), communicating provisioning information from an OSS such as the Contraction/Expansion/Elasticity Manager 378, etc.

The processor 710 can also transmit information between the pENUM and/or vENUM name servers, in particular the vENUM name servers 355A, 355B, . . . , 355N and the pENUM name servers 365A, 365B, . . . 365N via the I/O Data Ports 720. This information can include name server queries and responses.

According to an illustrative embodiment, the processor 710 of a Configuration OSS 374 can perform instantiation of vENUM NS instances as described above with reference to FIGS. 4A and 4B. The processor 710 can also perform various other steps for orchestrating vENUM deployment as described above with regard to FIG. 4C. The processor 710 of a name server, such as a pENUM name server 365A, . . . , 365N, can perform various steps for determining whether to forward requests for communication services as described above with reference to FIG. 4D.

A processor 710 can transmit data indicative of vENUM instantiation via the I/O Data Ports 720. The I/O Data Ports 720 can be implemented with, e.g., an interface including a local area network interface, an antenna or other suitable type of transceiver through which data and signals may be transmitted and received wired and/or wirelessly.

The computing device 700 also includes a physical hard drive 780. The processor 710 communicates with the memory 730 and the hard drive 780 via, e.g., an address/data bus (not shown). The memory is 730 is representative of the overall hierarchy of memory devices containing the software and data used to implement the functionality of the device 700. The memory 730 can include, but is not limited to various types of storage such as, for example, but not limited to, random access memory, read-only memory. As shown in FIG. 7, the memory 730 may include several categories of software and data used in the device 700, including applications 740, a database 750, an operating system (OS) 760, and input/output (I/O) device drivers 770.

The I/O device drivers 770 may include various routines accessed through at least one of the OS 760 by the applications 740 to communicate with devices and certain memory components.

The applications 740 can be stored in the memory 730 and/or in a firmware (not shown) as executable instructions, and can be executed by the processor 710. The applications 740 include various programs that implement the various features of the device 700. The applications 740 may include applications for implementing various steps described with reference to FIGS. 4A-4D, for example.

The database 750 represents the static and dynamic data used by the applications 740, the OS 760, the I/O device drivers 770 and other software programs that may reside in the memory 730. The database 750 be used to store data including listings of flavors of virtual machines available for instantiation, groupings of telephone numbers assigned to pENUM instances, a current configuration of vENUM instances and pENUM instances, memory requirements of pENUM instances, etc. Examples of such data are discussed above with reference to FIGS. 5 and 6. The database 750 may also be used to store directives of a name server indicating whether requests for various telephone number ranges should be forwarded.

While the memory 730 and storage (e.g., flash drive or hard drive) 780 are illustrated as residing proximate the processor 710, it should be understood that at least a portion of the memory 730 and/or hard drive 780 can be remotely accessed, for example, via another server in the cloud, a remote hard disk drive, a removable storage medium, combinations thereof, and the like. Thus, any of the data, applications, and/or software described above can be stored within the memory 730 and/or accessed via network connections to other data processing systems (not shown) that may include a local area network (LAN), a metropolitan area network (MAN), or a wide area network (WAN), for example.

Although not illustrated, it should be appreciated that other components described may be implemented with a computing device similar to that shown in FIG. 7. For example, the Fault Detection OSS 372, the Configuration OSS 374, the Contraction/Expansion/Elasticity OSS 378, and the Performance Monitoring OSS 376 may each contain a processor, a storage (e.g., drive), and a memory having applications including instructions which, when executed by the processor, cause the processor to perform operations to execute the policies as described above. Further, each name server of a vENUM site may be implemented in a similar manner, albeit with virtual components operating on a host computing device.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:
1. A method comprising:
   determining, by a processor of a physical telephone number mapping service server, whether to forward a request for communication services associated with a specific number range to a virtual telephone number mapping service server;
   responsive to determining to forward the request, determining, by the processor, whether a virtual telephone number mapping service instance has been provisioned to handle requests associated with the specific number range; and
   responsive to determining that the virtual telephone number mapping service instance has been provisioned to handle requests associated with the specific number range, forwarding, by the processor, the request to the virtual telephone number mapping service instance.

2. The method of claim 1, further comprising, responsive to determining not to forward the request, handling the request by the physical telephone number mapping service server.

3. The method of claim 1, further comprising, responsive to determining that the virtual telephone number mapping service instance has not been provisioned to handle requests associated with the specific number range, handling the request by the physical telephone number mapping service server.

4. The method of claim 1, wherein determining whether to forward the request is based on configuration data associated with the physical telephone number mapping service server.

5. The method of claim 4, wherein the configuration data is associated with the specific number range and indicates whether the physical telephone number mapping service server should forward requests associated with the specific number range.

6. The method of claim 1, wherein determining whether the virtual telephone number mapping service instance has been provisioned to handle requests associated with the specific number range comprises determining whether an address pool for a number of virtual telephone number mapping service instances has been provisioned for the physical telephone number mapping service server for handling requests associated with the specific number range.

7. A physical telephone number mapping service server comprising:
a processor; and
a memory having instructions stored thereon which, when executed by the processor, cause the processor to perform operations comprising:
determining whether to forward a request for communication services associated with a specific number range to a virtual telephone number mapping service server,
responsive to determining to forward the request, determining whether a virtual telephone number mapping service instance has been provisioned to handle requests associated with the specific number range, and
responsive to determining that the virtual telephone number mapping service instance has been provisioned to handle requests associated with the specific number range, forwarding the request to the virtual telephone number mapping service instance.

8. The physical telephone number mapping service server of claim 7, wherein the operations further comprise responsive to determining not to forward the request, handling the request by the physical telephone number mapping service server.

9. The physical telephone number mapping service server of claim 7, wherein the operations further comprise responsive to determining that the virtual telephone number mapping service instance has not been provisioned to handle requests associated with the specific number range, handling the request by the physical telephone number mapping service server.

10. The physical telephone number mapping service server of claim 7, wherein determining whether to forward the request is based on configuration data associated with the physical telephone number mapping service server.

11. The physical telephone number mapping service server of claim 10, wherein the configuration data is associated with the specific number range and indicates whether the physical telephone number mapping service server should forward requests associated with the specific number range.

12. The physical telephone number mapping service server of claim 7, wherein determining whether the virtual telephone number mapping service instance has been provisioned to handle requests associated with the specific number range comprises determining whether an address pool for a number of virtual telephone number mapping service instances has been provisioned for the physical telephone number mapping service server for handling requests associated with the specific number range.

13. A computer readable storing device having instructions stored thereon which, when executed by a processor of a physical telephone number mapping service server, cause the processor to perform operations comprising:
determining whether to forward a request for communication services associated with a specific number range to a virtual telephone number mapping service server;
responsive to determining to forward the request, determining whether a virtual telephone number mapping service instance has been provisioned to handle requests associated with the specific number range; and
responsive to determining that the virtual telephone number mapping service instance has been provisioned to handle requests associated with the specific number range, forwarding the request to the virtual telephone number mapping service instance.

14. The computer readable storage device of claim 13, wherein the operations further comprise responsive to determining not to forward the request, handling the request by the physical telephone number mapping service server.

15. The computer readable storage device of claim 13, wherein the operations further comprise responsive to determining that the virtual telephone number mapping service instance has not been provisioned to handle requests associated with the specific number range, handling the request by the physical telephone number mapping service server.

16. The computer readable storage device of claim 13, wherein determining whether to forward the request is based on configuration data associated with the specific number range that indicates whether requests associated with the specific number range should be forwarded.

17. The computer readable storage device of claim 13, wherein determining whether the virtual telephone number mapping service instance has been provisioned to handle requests associated with the specific number range comprises determining whether an address pool for a number of virtual telephone number mapping service instances has been provisioned for the physical telephone number mapping service server for handling requests associated with the specific number range.

* * * * *